United States Patent
Yu

(10) Patent No.: US 11,498,543 B2
(45) Date of Patent: Nov. 15, 2022

(54) VEHICLE BRAKE SYSTEM WITH BRAKE FADE DETECTION

(71) Applicant: ZF Active Safety US Inc., Livonia, MI (US)

(72) Inventor: Wenbo Yu, Canton, MI (US)

(73) Assignee: ZF Active Safety US Inc., Livonia, MI (US)

( * ) Notice: Subject to any disclaimer, the term of this patent is extended or adjusted under 35 U.S.C. 154(b) by 168 days.

(21) Appl. No.: 16/548,237

(22) Filed: Aug. 22, 2019

(65) Prior Publication Data

US 2020/0062233 A1 Feb. 27, 2020

Related U.S. Application Data

(60) Provisional application No. 62/722,649, filed on Aug. 24, 2018.

(51) Int. Cl.
*B60T 17/22* (2006.01)
*B60T 13/74* (2006.01)

(52) U.S. Cl.
CPC .......... *B60T 17/221* (2013.01); *B60T 13/745* (2013.01)

(58) Field of Classification Search
CPC ...... B60T 13/662; B60T 13/686; B60T 7/042; B60T 17/22; B60T 17/221; B60T 8/172; B60T 8/88; B60T 8/885; B60T 8/17; B60T 8/48; B60T 2270/40; B60T 2270/406
USPC ............................................ 702/180; 701/70
See application file for complete search history.

(56) References Cited

U.S. PATENT DOCUMENTS

| | | | | |
|---|---|---|---|---|
| 3,899,916 A | * | 8/1975 | Cline | G01L 5/225 73/126 |
| 6,318,817 B1 | * | 11/2001 | Martin | B60T 7/042 303/116.1 |
| 8,718,893 B1 | * | 5/2014 | Kim | B60T 7/042 701/70 |
| 8,731,795 B2 | * | 5/2014 | Frashure | B60T 13/585 701/94 |
| 2013/0197771 A1 | * | 8/2013 | Takeda | B60T 13/745 701/70 |
| 2014/0026557 A1 | * | 1/2014 | Ohnishi | B60T 13/745 60/545 |
| 2015/0151729 A1 | * | 6/2015 | Yamasoe | B60T 7/042 303/122.03 |

(Continued)

OTHER PUBLICATIONS

Sarjakoski L.T., Sarjakoski T. (2016) User Interfaces and Adaptive Maps. In: Shekhar S., Xiong H., Zhou X. (eds) Encyclopedia of GIS. Springer, Cham. https://doi.org/10.1007/978-3-319-23519-6_1431-2 (Year: 2016).*

(Continued)

*Primary Examiner* — Robert A. Siconolfi
*Assistant Examiner* — Stephen M Bowes
(74) *Attorney, Agent, or Firm* — Robert James Harwood

(57) ABSTRACT

A method of detecting brake fade for a vehicle brake system having wheel brakes susceptible to brake fade, includes the steps of: (a) providing a brake system including wheel brakes; and (b) determining the presence of brake fade within the vehicle system utilizing adaptive references maps, and wherein the adaptive reference maps include storing vehicle deceleration data and brake system fluid volume at different pressure points in a histogram.

10 Claims, 6 Drawing Sheets

(56) References Cited

U.S. PATENT DOCUMENTS

2018/0141533 A1* 5/2018 Rifici .................. B60T 8/17

OTHER PUBLICATIONS

CQE ACademy. Histograms. https://www.cqeacademy.com/cqe-body-of-knowledge/continuous-improvement/quality-control-tools/histograms/ (Year: 2016).*

* cited by examiner

VEHICLE BRAKE SYSTEM WITH BRAKE FADE DETECTION

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Brake systems may also include autonomous braking capabilities such as adaptive cruise control (ACC). During an autonomous braking event, various sensors and systems monitor the traffic conditions ahead of the vehicle and automatically activate the brake system to decelerate the vehicle as needed. Autonomous braking may be configured to respond rapidly in order to avoid an emergency situation. The brake system may be activated without the driver depressing the brake pedal or even if the driver fails to apply adequate pressure to the brake pedal.

DETAILED DESCRIPTION OF THE PREFERRED EMBODIMENT

Figure 1:
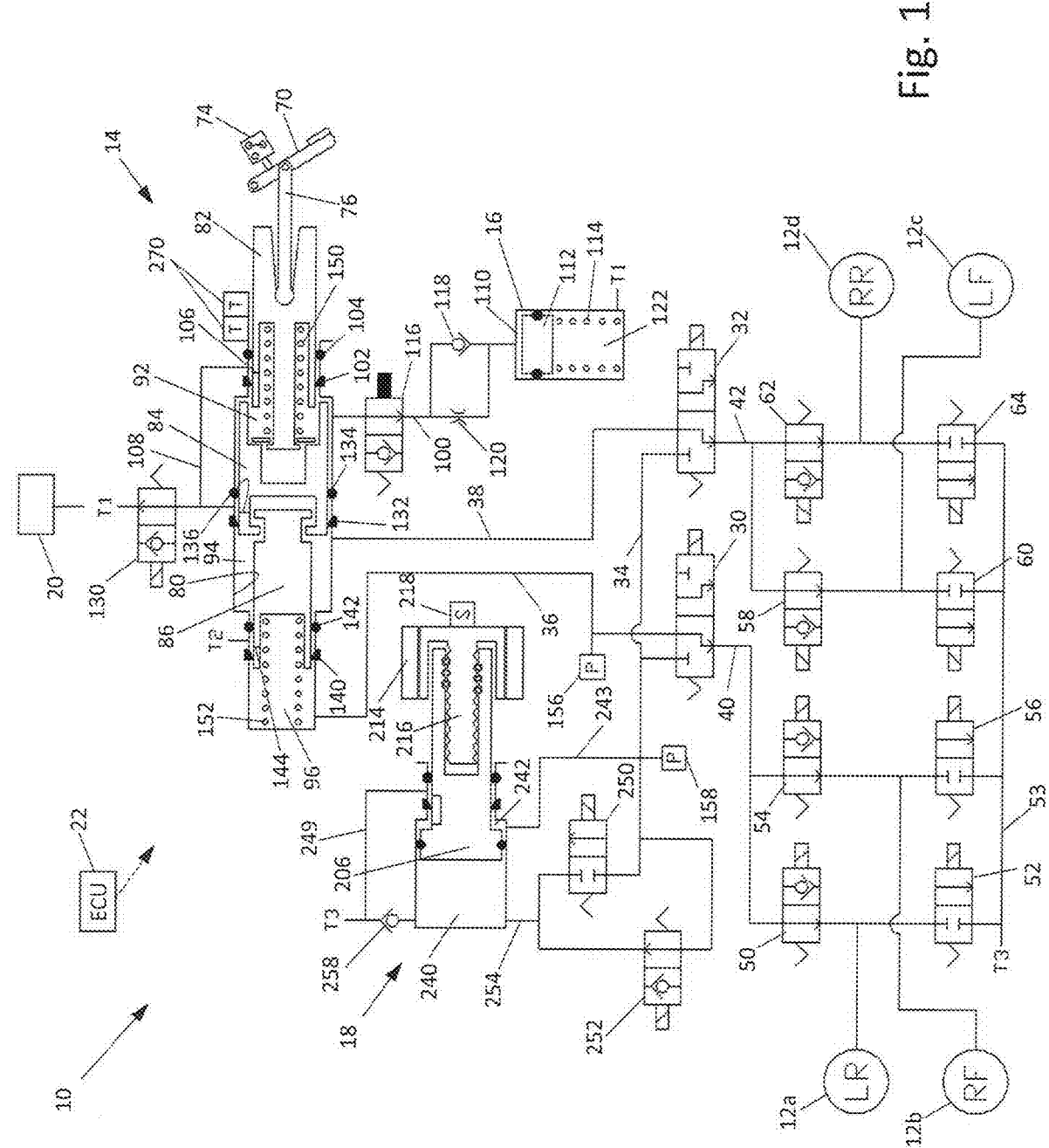
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12a, 12b, 12c, and 12d. The wheel brakes 12a, 12b, 12c, and 12d can have any suitable wheel brake structure operated by the application of pressurized brake fluid. The wheel brakes 12a, 12b, 12c, and 12d may include, for example, a brake caliper mounted on the vehicle to engage a frictional element (such as a brake disc) that rotates with a vehicle wheel to effect braking of the associated vehicle wheel. The wheel brakes 12a, 12b, 12c, and 12d can be associated with any combination of front and rear wheels of the vehicle in which the brake system 10 is installed. A diagonally split brake system is illustrated such that the wheel brake 12a is associated with the left rear wheel, the wheel brake 12b is associated with the right front wheel, the wheel brake 12c is associated with the left front wheel, and the wheel brake 12d is associated with the right rear wheel. Alternatively for a vertically split system, the wheel brakes 12a and 12b may be associated with the front wheels, and the wheel brakes 12c and 12d may be associated with the rear wheels.

The brake system 10 includes a brake pedal unit, indicated generally at 14, a pedal simulator 16, a plunger assembly, indicated generally at 18, and a reservoir 20. The reservoir 20 stores and holds hydraulic fluid for the brake system 10. The fluid within the reservoir 20 is preferably held at or about atmospheric pressure but may store the fluid at other pressures if so desired. The brake system 10 may include a fluid level sensor (not shown) for detecting the fluid level of the reservoir 20. Note that in the schematic illustration of FIG. 1, conduit lines may not be specifically drawn leading to the reservoir 20 but may be represented by conduits ending and labelled with T1, T2, or T3 indicating that these various conduits are connected to one or more tanks or sections of the reservoir 20. Alternatively, the reservoir 20 may include multiple separate housings. As will be discussed in detail below, the plunger assembly 18 of the brake system 10 functions as a source of pressure to provide a desired pressure level to the wheel brakes 12a, 12b, 12c, and 12d during a typical or normal brake apply. Fluid from the wheel brakes 12a, 12b, 12c, and 12d may be returned to the plunger assembly 18 and/or diverted to the reservoir 20.

The brake system 10 includes an electronic control unit (ECU) 22. The ECU 22 may include microprocessors. The ECU 22 receives various signals, processes signals, and controls the operation of various electrical components of the brake system 10 in response to the received signals. The ECU 22 can be connected to various sensors such as pressure sensors, travel sensors, switches, wheel speed sensors, and steering angle sensors. The ECU 22 may also be connected to an external module (not shown) for receiving information related to yaw rate, lateral acceleration, longitudinal acceleration of the vehicle such as for controlling the brake system 10 during vehicle stability operation. Additionally, the ECU 22 may be connected to the instrument cluster for collecting and supplying information related to warning indicators such as an ABS warning light, a brake fluid level warning light, and a traction control/vehicle stability control indicator light.

The brake system 10 further includes first and second isolation valves 30 and 32. The isolation valves 30 and 32 may be solenoid actuated three way valves. The isolation valves 30 and 32 are generally operable to two positions, as schematically shown in FIG. 1. The first and second isolation valves 30 and 32 each have a port in selective fluid communication with an output conduit 34 generally in communication with an output of the plunger assembly 18, as will be discussed below. The first and second isolation valves 30 and 32 also includes ports that are selectively in fluid communication with conduits 36 and 38, respectively, when the first and second isolation valves 30 and 32 are non-energized, as shown in FIG. 1. The first and second isolation valves 30 and 32 further include ports that are in fluid communication with conduits 40 and 42, respectively, which provide fluid to and from the wheel brakes 12a, 12b, 12c, and 12d.

In a preferred embodiment, the first and/or second isolation valves 30 and 32 may be mechanically designed such that flow is permitted to flow in the reverse direction (from conduit 34 to the conduits 36 and 38, respectively) when in their de-energized positions and can bypass the normally closed seat of the valves 30 and 32. Thus, although the 3-way valves 30 and 32 are not shown schematically to indicate this fluid flow position, it is noted that that the valve design may permit such fluid flow. This may be helpful in performing self-diagnostic tests of the brake system 10.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the first isolation valve 30 to the wheel brake 12a, and for cooperatively relieving pressurized fluid from the wheel brake 12a to a reservoir conduit 53 in fluid communication with the reservoir 20. A second set of valves includes a second apply valve 54 and a second dump valve 56 in fluid communication with the conduit 40 for cooperatively supplying fluid received from the first isolation valve 30 to the wheel brake 12b, and for cooperatively relieving pressurized fluid from the wheel brake 12b to the reservoir conduit 53. A third set of valves includes a third apply valve 58 and a third dump valve 60 in fluid communication with the conduit 42 for cooperatively supplying fluid received from the second isolation valve 32 to the wheel brake 12c, and for cooperatively relieving pressurized fluid from the wheel brake 12c to the reservoir conduit 53. A fourth set of valves includes a fourth apply valve 62 and a fourth dump valve 64 in fluid communication with the conduit 42 for cooperatively supplying fluid received from the second isolation valve 32 to the wheel brake 12d, and for cooperatively relieving pressurized fluid from the wheel brake 12d to the reservoir conduit 53. Note that in a normal braking event, fluid flows through the non-energized open apply valves 50, 54, 58, and 62. Additionally, the dump valves 52, 56, 60, and 64 are preferably in their non-energized closed positions to prevent the flow of fluid to the reservoir 20.

The brake pedal unit 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, the brake pedal unit 14 may be used as a back-up source of pressurized fluid to essentially replace the normally supplied source of pressurized fluid from the plunger assembly 18 under certain failed conditions of the brake system 10. The brake pedal unit 14 can supply pressurized fluid in the conduits 36 and 38 (that are normally closed off at the first and second isolation valves 30 and 32 during a normal brake apply) to the wheel brake 12a, 12b, 12c, and 12d as required.

The brake pedal unit 14 includes a housing having a multi-stepped bore 80 formed therein for slidably receiving various cylindrical pistons and other components therein. The housing may be formed as a single unit or include two or more separately formed portions coupled together. An input piston 82, a primary piston 84, and a secondary piston 86 are slidably disposed within the bore 80. The input piston 82 is connected with the brake pedal 70 via a linkage arm 76. Leftward movement of the input piston 82, the primary piston 84, and the secondary piston 86 may cause, under certain conditions, a pressure increase within an input chamber 92, a primary chamber 94, and a secondary chamber 96, respectively. Various seals of the brake pedal unit 14 as well as the structure of the housing and the pistons 82, 84, and 86 define the chambers 92, 94, and 96. For example, the input chamber 92 is generally defined between the input piston 82 and the primary piston 84. The primary chamber 94 is generally defined between the primary piston 84 and the secondary piston 86. The secondary chamber 96 is generally defined between the secondary piston 86 and an end wall of the housing formed by the bore 80.

The input chamber 92 is in fluid communication with the pedal simulator 16 via a conduit 100, the reason for which will be explained below. The input piston 82 is slidably disposed in the bore 80 of the housing of the brake pedal unit 14. An outer wall of the input piston 82 is engaged with a lip seal 102 and a seal 104 mounted in grooves formed in the housing. A passageway 106 (or multiple passageways) is formed through a wall of the piston 82. As shown in FIG. 1, when the brake pedal unit 14 is in its rest position (the driver is not depressing the brake pedal 70), the passageway 106 is located between the lip seal 102 and the seal 104. In the rest position, the passageway 106 permits fluid communication between the input chamber 92 and the reservoir 20 via a conduit 108. Sufficient leftward movement of the input piston 82, as viewing FIG. 1, will cause the passageway 106 to move past the lip seal 102, thereby preventing the flow of fluid from the input chamber 92 into the conduit 108 and the reservoir 20. Further leftward movement of the input piston 82 will pressurize the input chamber 92 causing fluid to flow into the pedal simulator 16 via the conduit 100. As fluid is diverted into the pedal simulator 16, a simulation chamber 110 within the pedal simulator 16 will expand causing movement of a piston 112 within the pedal simulator 16. Movement of the piston 112 compresses a spring assembly, schematically represented as a spring 114. The compression of the spring 114 provides a feedback force to the driver of the vehicle which simulates the forces a driver feels at the brake pedal 70 in a conventional vacuum assist hydraulic brake system, for example. The spring 114 of the pedal simulator 16 can include any number and types of spring members as desired. For example, the spring 114 may include a combination of low rate and high rate spring elements to provide a non-linear force feedback. The simulation chamber 110 is in fluid communication with the conduit 100 which is in fluid communication with the input chamber 92. A solenoid actuated simulator valve 116 is positioned within the conduit 100 to selectively prevent the flow of fluid from the input chamber 92 to the simulation chamber, such as during a failed condition in which the brake pedal unit 14 is utilized to provide a source of pressurized fluid to the wheel brakes. A check valve 118 in parallel with a restricted orifice 120 may be positioned with the conduit 100. The spring 114 of the pedal simulator 16 may be housed within a non-pressurized chamber 122 in fluid communication with the reservoir 20 (T1).

As discussed above, the input chamber 92 of the brake pedal unit 14 is selectively in fluid communication with the reservoir 20 via a conduit 108 and the passageway 106 formed in the input piston 82. The brake system 10 may include an optional simulator test valve 130 located within the conduit 108. The simulator test valve 130 may be electronically controlled between an open position, as shown in FIG. 1, and a powered closed position. The simulator test valve 130 is not necessarily needed during a normal boosted brake apply or for a manual push through mode. The simulator test valve 130 can be energized to a closed position during various testing modes to determine the correct operation of other components of the brake system 10. For example, the simulator test valve 130 may be energized to a closed position to prevent venting to the reservoir 20 via the conduit 108 such that a pressure build up in the brake pedal unit 14 can be used to monitor fluid flow to determine whether leaks may be occurring through seals of various components of the brake system 10.

The primary chamber 94 of the brake pedal unit 14 is in fluid communication with the second isolation valve 32 via the conduit 38. The primary piston 84 is slidably disposed in the bore 80 of the housing of the brake pedal unit 14. An outer wall of the primary piston 84 is engaged with a lip seal 132 and a seal 134 mounted in grooves formed in the housing. One or more passageways 136 are formed through a wall of the primary piston 84. The passageway 136 is located between the lip seal 132 and the seal 134 when the primary piston 84 is in its rest position, as shown in FIG. 1. Note that in the rest position the lip seal 132 is just slightly to the left of the passageway 136, thereby permitting fluid communication between the primary chamber 94 and the reservoir 20.

The secondary chamber 96 of the brake pedal unit 14 is in fluid communication with the first isolation valve 30 via the conduit 36. The secondary piston 86 is slidably disposed in the bore 80 of the housing of the brake pedal unit 14. An outer wall of the secondary piston 86 is engaged with a lip seal 140 and a seal 142 mounted in grooves formed in the housing. One or more passageways 144 are formed through a wall of the secondary piston 86. As shown in FIG. 1, the passageway 144 is located between the lip seal 140 and the seal 142 when the secondary piston 86 is in its rest position. Note that in the rest position the lip seal 140 is just slightly to the left of the passageway 144, thereby permitting fluid communication between the secondary chamber 96 and the reservoir 20 (T2).

If desired, the primary and secondary pistons 84 and 86 may be mechanically connected with limited movement therebetween. The mechanical connection of the primary and secondary pistons 84 and 86 prevents a large gap or distance between the primary and secondary pistons 84 and 86 and prevents having to advance the primary and secondary pistons 84 and 86 over a relatively large distance without any increase in pressure in the non-failed circuit. For example, if the brake system 10 is under a manual push through mode and fluid pressure is lost in the output circuit relative to the secondary piston 86, such as for example in the conduit 36, the secondary piston 86 will be forced or biased in the leftward direction due to the pressure within the primary chamber 94. If the primary and secondary pistons 84 and 86 were not connected together, the secondary piston 86 would freely travel to its further most left-hand position, as viewing FIG. 1, and the driver would have to depress the pedal 70 a distance to compensate for this loss in travel. However, because the primary and secondary pistons 84 and 86 are connected together, the secondary piston 86 is prevented from this movement and relatively little loss of travel occurs in this type of failure. Any suitable mechanical connection between the primary and secondary pistons 84 and 86 may be used. For example, as schematically shown in FIG. 1, the right-hand end of the secondary piston 86 may include an outwardly extending flange that extends into a groove formed in an inner wall of the primary piston 84. The groove has a width which is greater than the width of the flange, thereby providing a relatively small amount of travel between the first and secondary pistons 84 and 86 relative to one another.

The brake pedal unit 14 may include an input spring 150 generally disposed between the input piston 82 and the primary piston 84. Additionally, the brake pedal unit 14 may include a primary spring (not shown) disposed between the primary piston 84 and the secondary piston 86. A secondary spring 152 may be included and disposed between the secondary piston 86 and a bottom wall of the bore 80. The input, primary and secondary springs may have any suitable configuration, such as a caged spring assembly, for biasing the pistons in a direction away from each other and also to properly position the pistons within the housing of the brake pedal unit 14.

The brake system 10 may further include a pressure sensor 156 in fluid communication with the conduit 36 to detect the pressure within the secondary pressure chamber 96 and for transmitting the signal indicative of the pressure to the ECU 22. Additionally, the brake system 10 may further include a pressure sensor 158 in fluid communication with the conduit 34 for transmitting a signal indicative of the pressure at the output of the plunger assembly 18.

Figure 2:
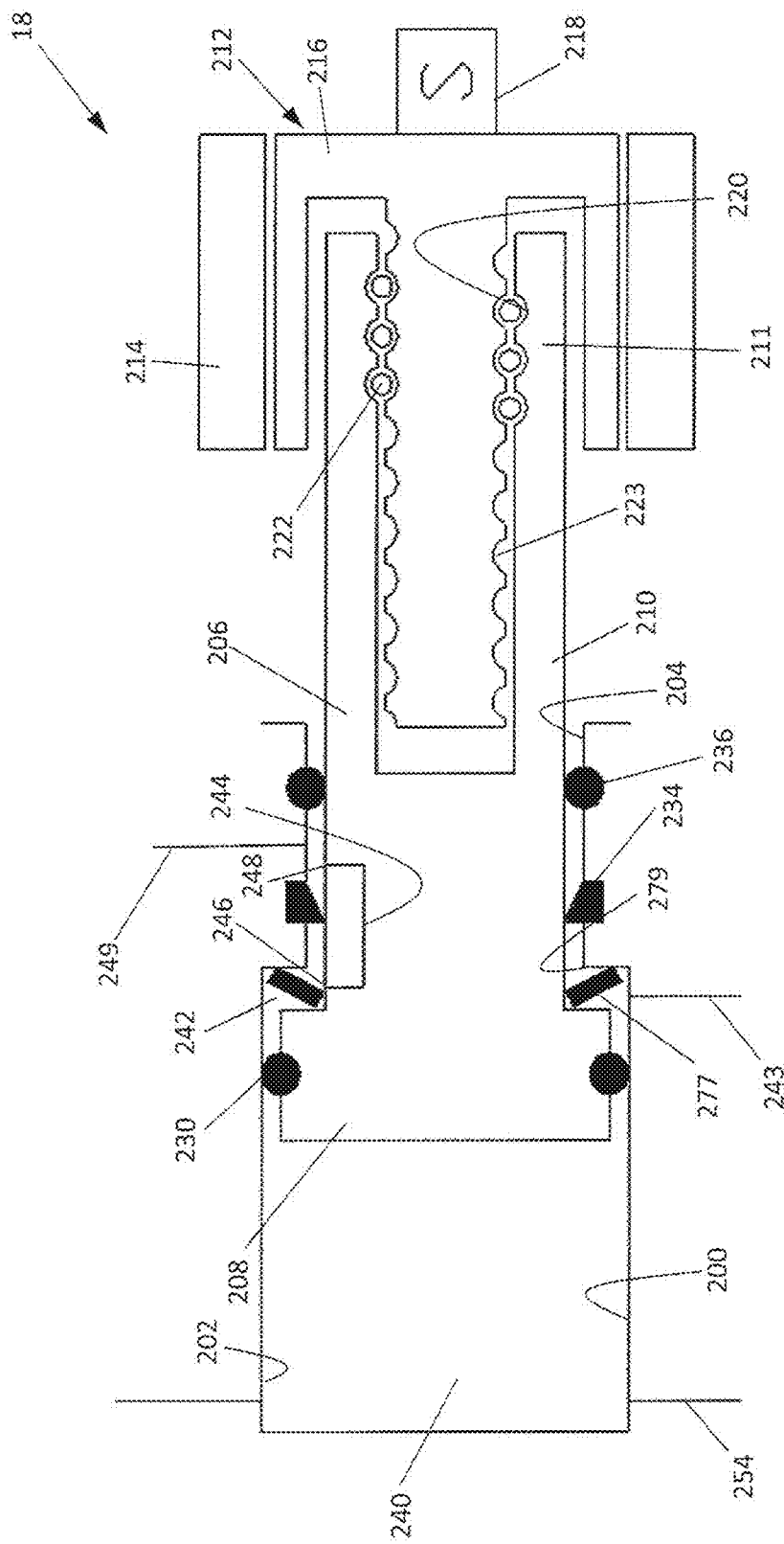
FIG. 2 is an enlarged schematic illustration of the plunger assembly of the brake system of FIG. 1.

As shown schematically in FIG. 2, the plunger assembly 18 includes a housing having a multi-stepped bore 200 formed therein. The bore 200 includes a first portion 202 and a second portion 204. A piston 206 is slidably disposed within the bore 200. The piston 206 includes an enlarged end portion 208 connected to a smaller diameter central portion 210. The piston 206 has a second end 211 connected to a ball screw mechanism, indicated generally at 212. The ball screw mechanism 212 is provided to impart translational or linear motion of the piston 206 along an axis defined by the bore 200 in both a forward direction (leftward as viewing FIGS. 1 and 2), and a rearward direction (rightward as viewing FIGS. 1 and 2) within the bore 200 of the housing. In the embodiment shown, the ball screw mechanism 212 includes a motor 214 rotatably driving a screw shaft 216. The second end 211 of the piston 206 includes a threaded bore 220 and functions as a driven nut of the ball screw mechanism 212. The ball screw mechanism 212 includes a plurality of balls 222 that are retained within helical raceways 223 formed in the screw shaft 216 and the threaded bore 220 of the piston 206 to reduce friction. Although a ball screw mechanism 212 is shown and described with respect to the plunger assembly 18, it should be understood that other suitable mechanical linear actuators may be used for imparting movement of the piston 206. It should also be understood that although the piston 206 functions as the nut of the ball screw mechanism 212, the piston 206 could be configured to function as a screw shaft of the ball screw mechanism 212. Of course, under this circumstance, the screw shaft 216 would be configured to function as a nut having internal helical raceways formed therein. The piston 206 may include structures (not shown) engaged with cooperating structures formed in the housing of the plunger assembly 18 to prevent rotation of the piston 206 as the screw shaft 216 rotates around the piston 206. For example, the piston 206 may include outwardly extending splines or tabs (not shown) that are disposed within longitudinally extending grooves (not shown) formed in the housing of the plunger assembly 18 such that the tabs slide along within the grooves as the piston 206 travels in the bore 200.

As will be discussed below, the plunger assembly 18 is preferably configured to provide pressure to the conduit 34 when the piston 206 is moved in both the forward and rearward directions. The plunger assembly 18 includes a seal 230 mounted on the enlarged end portion 208 of the piston 206. The seal 230 slidably engages with the inner cylindrical surface of the first portion 202 of the bore 200 as the piston 206 moves within the bore 200. A seal 234 and a seal 236 are mounted in grooves formed in the second portion 204 of the bore 200. The seals 234 and 236 slidably engage with the outer cylindrical surface of the central portion 210 of the piston 206. A first pressure chamber 240 is generally defined by the first portion 202 of the bore 200, the enlarged end portion 208 of the piston 206, and the seal 230. An annular shaped second pressure chamber 242, located generally behind the enlarged end portion 208 of the piston 206, is generally defined by the first and second portions 202 and 204 of the bore 200, the seals 230 and 234, and the central portion 210 of the piston 206. The seals 230, 234, and 236 can have any suitable seal structure.

Although the plunger assembly 18 may be configured to any suitable size and arrangement, in one embodiment, the effective hydraulic area of the first pressure chamber 240 is greater than the effective hydraulic area of the annular shaped second pressure chamber 242. The first pressure chamber 240 generally has an effective hydraulic area corresponding to the diameter of the central portion 210 of the piston 206 (the inner diameter of the seal 234) since fluid is diverted through the conduits 254, 34, and 243 as the piston 206 is advanced in the forward direction. The second pressure chamber 242 generally has an effective hydraulic area corresponding to the diameter of the first portion 202 of the bore 200 minus the diameter of the central portion 210 of the piston 206. This configuration provides that on the back stroke in which the piston 206 is moving rearwardly, less torque (or power) is required by the motor 214 to maintain the same pressure as in its forward stroke. Besides using less power, the motor 214 may also generate less heat during the rearward stroke of piston 206. Under circumstances in which the driver presses on the pedal 70 for long durations, the plunger assembly 18 could be operated to apply a rearward stroke of the piston 206 to prevent overheating of the motor 214.

The plunger assembly 18 preferably includes a sensor, schematically shown as 218, for detecting the position of the piston 206 within the bore 200. The sensor 218 is in communication with the ECU 22. In one embodiment, the sensor 218 may detect the position of the piston 206, or alternatively, metallic or magnetic elements embedded with the piston 206. In an alternate embodiment, the sensor 218 may detect the rotational position of the motor 214 and/or other portions of the ball screw mechanism 212 which is indicative of the position of the piston 206. The sensor 218 can be located at any desired position.

The piston 206 of the plunger assembly 18 includes a passageway 244 formed therein. The passageway 244 defines a first port 246 extending through the outer cylindrical wall of the piston 206 and is in fluid communication with the secondary chamber 242. The passageway 244 also defines a second port 248 extending through the outer cylindrical wall of the piston 206 and is in fluid communication with a portion of the bore 200 located between the seals 234 and 236. The second port 248 is in fluid communication with a conduit 249 which is in fluid communication with the reservoir 20 (T3). When in the rest position, as shown in FIG. 2, the pressure chambers 240 and 242 are in fluid communication with the reservoir 20 via the conduit 249. This helps in ensuring a proper release of pressure at the output of the plunger assembly 18 and within the pressure chambers 240 and 242 themselves. After an initial forward movement of the piston 206 from its rest position, the port 248 will move past the lip seal 234, thereby closing off fluid communication of the pressure chambers 240 and 242 from the reservoir 20, thereby permitting the pressure chambers 240 and 242 to build up pressure as the piston 206 moves further.

Referring back to FIG. 1, the brake system 10 further includes a first plunger valve 250, and a second plunger valve 252. The first plunger valve 250 is preferably a solenoid actuated normally closed valve. Thus, in the non-energized state, the first plunger valve 250 is in a closed position, as shown in FIG. 1. The second plunger valve 252 is preferably a solenoid actuated normally open valve. Thus, in the non-energized state, the second plunger valve 252 is in an open position, as shown in FIG. 1. A check valve may be arranged within the second plunger valve 252 so that when the second plunger valve 252 is in its closed position, fluid may still flow through the second plunger valve 252 in the direction from a first output conduit 254 (from the first pressure chamber 240 of the plunger assembly 18) to the conduit 34 leading to the isolation valves 30 and 32. Note that during a rearward stroke of the piston 206 of the plunger assembly 18, pressure may be generated in the second pressure chamber 242 for output into the conduit 34.

Generally, the first and second plunger valves 250 and 252 are controlled to permit fluid flow at the outputs of the plunger assembly 18 and to permit venting to the reservoir 20 (T3) through the plunger assembly 18 when so desired. For example, the first plunger valve 250 may be energized to its open position during a normal braking event so that both of the first and second plunger valves 250 and 252 are open (which may reduce noise during operation). Preferably, the first plunger valve 250 is almost always energized during an ignition cycle when the engine is running. Of course, the first plunger valve 250 may be purposely moved to its closed position such as during a pressure generating rearward stroke of the plunger assembly 18. The first and second plunger valves 250 and 252 are preferably in their open positions when the piston 206 of the plunger assembly 18 is operated in its forward stroke to maximize flow. When the driver releases the brake pedal 70, the first and second plunger valves 250 and 252 preferably remain in their open positions. Note that fluid can flow through the check valve within the closed second plunger valve 252, as well as through a check valve 258 from the reservoir 20 depending on the travel direction of the piston 206 of the plunger assembly 18.

It may be desirable to configure the first plunger valve 250 with a relatively large orifice therethrough when in its open position. A relatively large orifice of the first plunger assembly 250 helps to provide an easy flow path therethrough. The second plunger valve 252 may be provided with a much smaller orifice in its open position as compared to the first plunger valve 250. One reason for this is to help prevent the piston 206 of the plunger assembly 18 from rapidly being back driven upon a failed event due to the rushing of fluid through the first output conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 18 upon failure of the brake system 10, such as for example, when power is lost to the motor 214 and the pressure within the conduit 34 is relatively high. As shown in FIG. 2, the plunger assembly 18 may include an optional spring member, such as a spring washer 277, to assist in cushioning such a rapid rearward back drive of the piston 206. The spring washer 277 may also assist in cushioning the piston 206 moving at any such speed as it approaches a rest position near its most retracted position within the bore 200. Schematically shown in FIG. 2, the spring washer 277 is located between the enlarged end portion 208 and a shoulder 279 formed in the bore 200 between the first and second portions 202 and 204. The spring washer 277 can have any suitable configuration which deflects or compresses upon contact with the piston 206 as the piston 206 moves rearwardly. For example, the spring washer 277 may be in the form of a metal conical spring washer. Alternatively, the spring washer 277 may be in the form of a wave spring. Although the spring washer 277 is shown mounted within the bore 200 of the plunger assembly 18, the spring washer 277 may alternatively be mounted on the piston 206 such that the spring washer 277 moves with the piston 206. In this configuration, the spring washer 277 would engage with the shoulder 279 and compress upon sufficient rightward movement of the piston 206.

The first and second plunger valves 250 and 252 provide for an open parallel path between the pressure chambers 240 and 242 of the plunger assembly 18 during a normal braking operation. Although a single open path may be sufficient, the advantage of having both the first and second plunger valves 250 and 252 is that the first plunger valve 250 may provide for an easy flow path through the relatively large orifice thereof, while the second plunger valve 252 may provide for a restricted orifice path during certain failed conditions (when the first plunger valve 250 is de-energized to its closed position.

During a typical or normal braking operation, the brake pedal 70 is depressed by the driver of the vehicle. In a preferred embodiment of the brake system 10, the brake pedal unit 14 includes one or more travel sensors 270 (for redundancy) for producing signals transmitted to the ECU 22 that are indicative of the length of travel of the input piston 82 of the brake pedal unit 14.

During normal braking operations, the plunger assembly 18 is operated to provide pressure to the conduit 34 for actuation of the wheel brakes 12a, 12b, 12c, and 12d. Under certain driving conditions, the ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the brake pedal unit 14, generated by depression of the brake pedal 70, is diverted into the pedal simulator 16. The simulator valve 116 is actuated to divert fluid through the simulator valve 116 from the input chamber 92. Note that the simulator valve 116 is shown in its energized state in FIG. 1. Thus, the simulator valve 116 is a normally closed solenoid valve. Also note that fluid flow from the input chamber 92 to the reservoir 20 is closed off once the passageway 106 in the input piston 82 moves past the seal 104.

During the duration of a normal braking event, the simulator valve 116 remains open, preferably. Also during the normal braking operation, the isolation valves 30 and 32 are energized to secondary positions to prevent the flow of fluid from the conduits 36 and 38 through the isolation valves 30 and 32, respectively. Preferably, the isolation valves 30 and 32 are energized throughout the duration of an ignition cycle such as when the engine is running instead of being energized on and off to help minimize noise. Note that the primary and secondary pistons 84 and 86 are not in fluid communication with the reservoir 20 due to their passageways 136 and 144, respectively, being positioned past the lip seals 132 and 140, respectively. Prevention of fluid flow through the isolation valves 30 and 32 hydraulically locks the primary and secondary chambers 94 and 96 of the brake pedal unit 14 preventing further movement of the primary and secondary pistons 84 and 86.

It is generally desirable to maintain the isolation valves 30 and 32 energized during the normal braking mode to ensure venting of fluid to the reservoir 20 through the plunger assembly 18 such as during a release of the brake pedal 70 by the driver. As best shown in FIG. 1, the passageway 244 formed in the piston 206 of the plunger assembly 18 permits this ventilation.

During normal braking operations, while the pedal simulator 16 is being actuated by depression of the brake pedal 70, the plunger assembly 18 can be actuated by the ECU 22 to provide actuation of the wheel brakes 12a, 12b, 12c, and 12d. The plunger assembly 18 is operated to provide desired pressure levels to the wheel brakes 12a, 12b, 12c, and 12d compared to the pressure generated by the brake pedal unit 14 by the driver depressing the brake pedal 70. The electronic control unit 22 actuates the motor 214 to rotate the screw shaft 216 in the first rotational direction. Rotation of the screw shaft 216 in the first rotational direction causes the piston 206 to advance in the forward direction (leftward as viewing FIGS. 1 and 2). Movement of the piston 206 causes a pressure increase in the first pressure chamber 240 and fluid to flow out of the first pressure chamber 240 and into the conduit 254. Fluid can flow into the conduit 34 via the open first and second plunger valves 250 and 252. Note that fluid is permitted to flow into the second pressure chamber 242 via a conduit 243 as the piston 206 advances in the forward direction. Pressurized fluid from the conduit 34 is directed into the conduits 40 and 42 through the isolation valves 320 and 322. The pressurized fluid from the conduits 40 and 42 can be directed to the wheel brakes 12a, 12b, 12c, and 12d through open apply valves 50, 54, 58, and 62 while the dump valves 52, 56, 60, and 64 remain closed. When the driver lifts off or releases the brake pedal 70, the ECU 22 can operate the motor 214 to rotate the screw shaft 216 in the second rotational direction causing the piston 206 to retract withdrawing the fluid from the wheel brakes 12a, 12b, 12c, and 12d. The speed and distance of the retraction of the piston 206 is based on the demands of the driver releasing the brake pedal 70 as sensed by the sensor 218. Under certain conditions, the pressurized fluid from the wheel brakes 12a, 12b, 12c, and 12d may assist in back-driving the ball screw mechanism 212 moving the piston 206 back towards its rest position.

In some situations, the piston 206 of the plunger assembly 18 may reach its full stroke length within the bore 200 of the housing and additional boosted pressure is still desired to be delivered to the wheel brakes 12a, 12b, 12c, and 12d. The plunger assembly 18 is a dual acting plunger assembly such that it is configured to also provide boosted pressure to the conduit 34 when the piston 206 is stroked rearwardly (rightward) or in a reverse direction. This has the advantage over a conventional plunger assembly that first requires its piston to be brought back to its rest or retracted position before it can again advance the piston to create pressure within a single pressure chamber. If the piston 206 has reached its full stroke, for example, and additional boosted pressure is still desired, the second plunger valve 252 is energized to its closed check valve position. The first plunger valve 250 is de-energized to its closed position. The electronic control unit 22 actuates the motor 214 in a second rotational direction opposite the first rotational direction to rotate the screw shaft 216 in the second rotational direction. Rotation of the screw shaft 216 in the second rotational direction causes the piston 206 to retract or move in the rearward direction (rightward as viewing FIGS. 1 and 2). Movement of the piston 206 causes a pressure increase in the second pressure chamber 242 and fluid to flow out of the second pressure chamber 242 and into the conduit 243 and the conduit 34. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through the opened apply valves 50, 54, 58, and 62 while dump valves 52, 56, 60, and 64 remain closed. In a similar manner as during a forward stroke of the piston 206, the ECU 22 can also selectively actuate the apply valves 50, 54, 58, and 62 and the dump valves 52, 56, 60, and 64 to provide a desired pressure level to the wheel brakes 12a, 12b, 12c, and 12d, respectively. When the driver lifts off or releases the brake pedal 70 during a pressurized rearward stroke of the plunger assembly 18, the first and second plunger valves 250 and 252 are preferably operated to their open positions, although having only one of the valves 250 and 252 open would generally still be sufficient. Note that when transitioning out of a slip control event, the ideal situation would be to have the position of the piston 206 and the displaced volume within the plunger assembly 18 correlate exactly with the given pressures and fluid volumes within the wheel brakes 12a, 12b, 12c, and 12d. However, when the correlation is not exact, fluid can be drawn from the reservoir 20 via the check valve 258 into the chamber 240 of the plunger assembly 18.

During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the ECU 22 can operate the plunger assembly 18 to provide a source of pressurized fluid directed to the wheel brakes, such as during an autonomous vehicle braking event.

In the event of a loss of electrical power to portions of the brake system 10, the brake system 10 provides for manual push through or manual apply such that the brake pedal unit 14 can supply relatively high pressure fluid to the conduits 36 and 38. During an electrical failure, the motor 214 of the plunger assembly 18 might cease to operate, thereby failing to produce pressurized hydraulic brake fluid from the plunger assembly 18. The isolation valves 30 and 32 will shuttle (or remain) in their positions to permit fluid flow from the conduits 36 and 38 to the wheel brakes 12*a*, 12*b*, 12*c*, and 12*d*. The simulator valve 116 is shuttled to its closed position to prevent fluid from flowing out of the input chamber 92 to the pedal simulator 16. During the manual push-through apply, the input piston 82, the primary piston 84, and the secondary piston 86 will advance leftwardly such that the passageways 106, 136, 144 will move past the seals 102, 132, and 140, respectively, to prevent fluid flow from their respective fluid chambers 92, 94, and 96 to the reservoir 20, thereby pressurizing the chambers 92, 94, and 96. Fluid flows from the chambers 94 and 96 into the conduits 38 and 36, respectively, to actuate the wheel brakes 12*a*, 12*b*, 12*c*, and 12*d*.

The inherent design of the brake system 10 allows the ECU 22, with the assistance of sensors, to be able to detect various braking conditions and alert the driver accordingly. For example, the brake system 10 could be configured to detect the presence of brake fade and alter the brake pedal feel to alert the driver that something is amiss. For example, the brake pedal feel could be altered such that a greater depression travel of the brake pedal 70 is required by the driver's foot to obtain the same braking force during a non-brake fade event. This alteration of the brake pedal feel can alert the driver that the brake system 10 is undergoing an issue, such as brake fade.

Brake fade can be defined as a temporary reduction of braking power within the wheel brakes of the vehicle. Brake fade typically occurs when the brake pad and the brake rotor no longer generate sufficient mutual friction therebetween due to a buildup of heat. Obviously, this results in unexpected brake system behavior. Generally, brake pads are designed to work within certain operating temperatures and if used outside this operating window the corresponding wheel brake will underperform. This abnormally high heat can be generated during various conditions such as high vehicle load conditions, high speed conditions, or steep alpine descent conditions. Since brake fade occurs when the brake pads are overheated, this phenomenon is usually only temporary and braking performance typically returns once the brakes have cooled down. During the brake fade event, however, it is generally desirable to alert the driver of this condition so that they can act accordingly and to later help reduce the buildup of heat within the wheel brakes.

With respect to the brake system 10, a different strategy for detecting and alerting the driver of brake fade should be taken into consideration compared to a conventional brake system. For example, in the brake system 10, direct feedback through the brake pedal 70 of the health of the brake system 10 may be altered, masked, or even non-existent. The overall brake pedal travel in normal operation of the brake system 10 is significantly reduced when compared to conventional brake systems.

In conventional brake systems, the driver can gain information about brake fade by experiencing a change in the pedal force/travel/deceleration relationship. The driver then has the ability to compensate directly by applying more force and adjusting to a longer pedal travel up to their capability. However, with the brake system 10, it is possible that the brake system 10 may incur (1) a loss of output and (2) an increase in compliance during faded braking if left unchecked, i.e., if the brake system 10 is not controlled to compensate for the detection and change in driver pedal feel behavior. A loss of output of braking pressure can cause additional pedal force and travel such that the driver will push deeper into the pedal stroke to command a higher pressure to achieve their desired vehicle deceleration. Since the force/travel characteristic of the brake system 10 is fixed, the pedal will remain "firm" for the driver. The driver may continue to push deeper until the end of the pedal travel is reached, whereby maximum pressure will then be commanded. Since the brake system 10 is preferably a closed loop system with respect to pressure, the brake system 10 will eventually compensate for the compliance increase. Since there is a fixed fluid volume available before the brake system 10 needs to be replenished, the driver will experience more replenishments if the compliance growth is large enough during advanced braking events such as ABS. This compliance increase may be of concern since there would be almost no direct pedal feel difference to the driver. Thus, it is desirable to provide a comprehensive strategy to handle performance of the brake system 10 and to give a desired warning.

Although a brake thermal model exists for use in conventional brake systems, it does not properly comprehend racetrack use or trailer towing if used as sole means to provide the driver notification. Therefore, it is preferred that brake output and system compliance are constantly monitored along with the brake thermal model, to detect faded brakes. There are generally three major components for the brake fade strategy with respect to the brake system 10: (1) Adaptive References, (2) Brake Fade Factors, and (3) Driver Notification and Mitigation.

With respect to adaptive references, it is preferred that pressure output (Output) references and Pressure-Volume (PV) references are established for the monitoring mechanism to compare the performance of the brake system 10 against. The characteristics of the brake system 10 can change during the life of the vehicle for multiple reasons. Thus, fixed and nominal references should not be used to monitor for a significant change in Output or PV caused by faded brakes. Therefore, adaptive references maps should be established and utilized. In a preferred operation, the maps will be adjusted after each ignition cycle if the thermal model confirms that the brake temperature is within normal operation range. At sufficiently high temperatures, the map learning will be stopped and the last known good map will be used as reference for this ignition cycle.

In a preferred method, the reference maps are established by storing vehicle deceleration and boost system volume at different pressure points into a histogram. The pressure points are pre-defined in the trims. They are preferably picked to cover a wide pressure range during braking. For example, the points may be 10 bar, 15 bar, 20 bar, 25 bar, 30 bar, 35 bar, 50 bar, and 100 bar. This can be referred to as an eight points reference table. If the learning conditions (as discussed below) are satisfied, every time there is boosted brake pressure, a searching algorithm looks for the pre-defined pressure points. If the current boost pressure is within the range of ±0.2 bar of one of the points, the current vehicle deceleration or volume data is learned to its map accordingly. To provide an accurate reference and shorten the learning period, the last known reference map is preferably stored in non-volatile random-access memory (NVRAM), and will be used as the starting point for each new ignition cycle. For new vehicles after manufacture, there may be one set of default reference trims for each map to start with.

One possible drawback of choosing the learning pressure points so widely is that some points can almost never be learned, such as for example, the 100 bar point. The reference will become less accurate at high pressure. Fortunately, it has been found that test data shows that the maps only shift up or down without much of offset variations across the whole pressure range when temperature increases. This characteristic enables projection to the adjusted reference for the un-learned pressure points. The algorithm calculates the offset between the learned value and the default reference value for each pressure point. The algorithm then weighs all of the offsets and adds them together as the final total offset. The more times one point has been learned, the more its offset weighs into the equation. In one example, the point 15 bar has been learned 20 times, and each of the other points have been learned 10 times. The 15 bar offset is 2, and the others are 1. Then the total times learned is 10×7+20=90. The 15 bar point weighs 20/90×100%=22.22%, and each other point weighs 10/90×100%=11.11%. Therefore, the final offset can be decided as 2×22.22%+1×11.11%×7=1.22. The final reference for those points that are never learned will then be shifted by 1.22.

Figure 3:
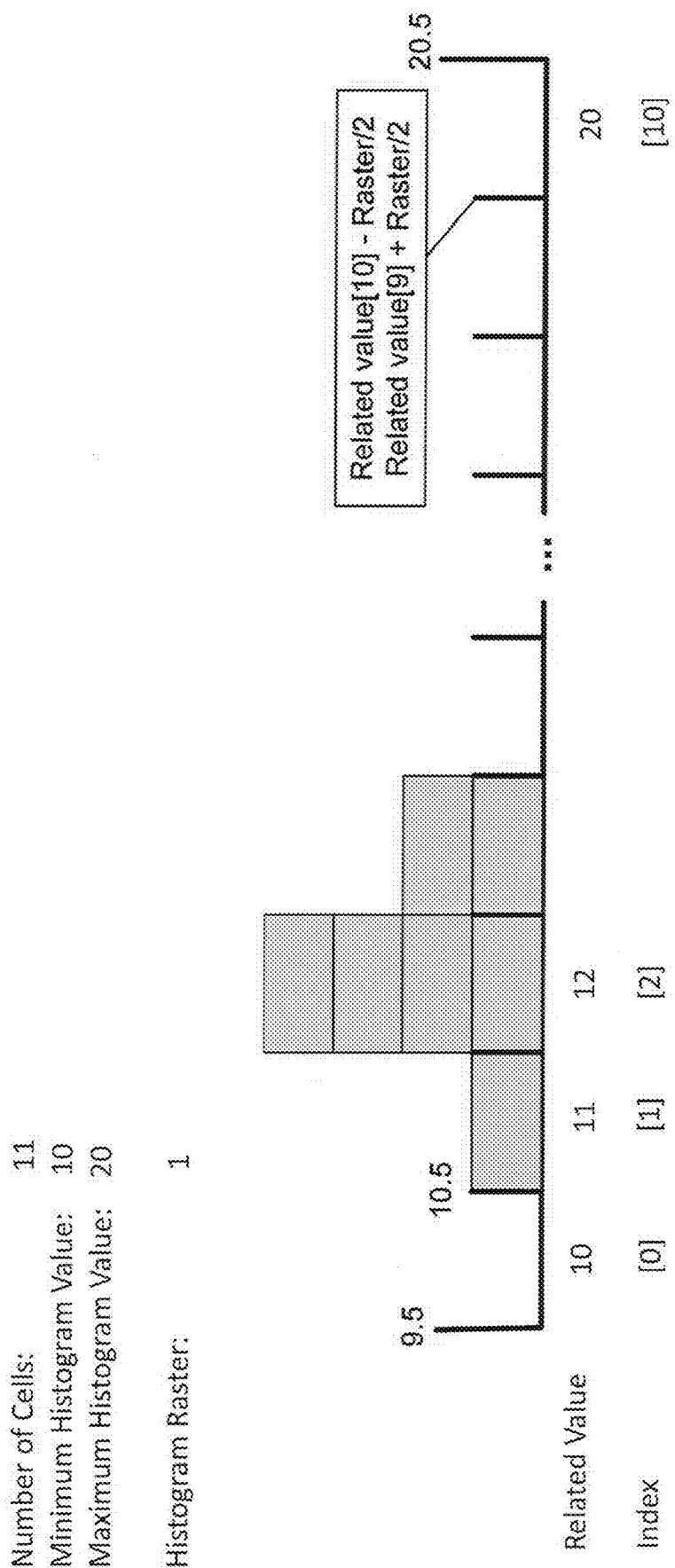
FIG. 3 is a graphical representation of an example of histogram data for use in an algorithm to determine brake fade.

The functionality of the histogram represents a special kind of filter. It is especially suitable for slow learning algorithms, because the latest value isn't used as the most reliable. For example, there is illustrated in FIG. 3 a figure or picture of a histogram. The main data of the histogram is the array shown in FIG. 3. FIG. 3 also illustrates how the given histogram trims (number of cells, min and max value) are interpreted. For brake fade reference learning, the importance is the average value of the histogram data, calculated with the equation:

$$\bar{x} = \frac{1}{n}\sum_{i=1}^{n} x_i$$

With respect to creating a PV Reference table, there are various conditions that preferably should be first met. These can be considered as enable conditions. One of those conditions is that the pressure gradient should be less than about 30 bar/s. The reference should not be established while the brake system 10 is undergoing a dynamic event. For example, this may not be desirable due to orifice effects within the brake system 10. A relatively large pressure gradient is a good indicator that the brake system 10 is undergoing a dynamic event. Another condition which should be first met prior to creating a PV reference table is that the pressure gradient should be greater than about −3 bar/s. The characteristic of the brake system 10 can make it difficult to calculate volume during a pressure release. Additionally, the slip control should not be active. Under slip control, the dump valves 52, 56, 60, 64 may open and the fluid volume that is diverted into the reservoir 20 can be hard to model. It is also generally not necessary to learn PV values during such events. Another condition that should be met is that the wheel brake temperature should be less than about 250 C. The PV characteristic changes along with brake temperature. It is preferred that reference should be only established under normal operating temperature. Another condition is that brake fade should not be detected.

Once learning is enabled, the eight points reference table pulls the average values from the histogram, and stores them in NVRAM. In the meantime, a PV threshold is established. Now, with given boost pressure, the fluid volume needed to generate this pressure can be looked up from the reference table. This volume then becomes the volume threshold.

With respect to creating a Deceleration Reference table, there are also various conditions that preferably should be first met. One of those conditions is that vehicle speed should be faster than about 4 m/s. The pressure gradient should also be less than about 30 bar/s since the reference should not be established while the vehicle or the brake system is under a dynamic event. The pressure gradient should be greater than about −3 bar/s. Vehicle deceleration to pressure relationship is not accounted for during a pressure release. Additionally, slip control should not be active. Also, boost pressure should be larger than about 15 bar. There should be some pressure already in the system before enabling the learning to avoid the initial pitch moment of the vehicle at the beginning of a braking event. Additionally, the wheel brake temperature should be less than about 250 C. Another condition is that brake fade should not be detected.

Similar to the PV reference table, a pressure to deceleration reference table is established during each braking events. Now, with a given boost pressure, the deceleration threshold can be looked up from the reference table. The deceleration data used can be termed "decel generated by brake". This "decel generated by brake" signal is provided by the brake system 10 such as by the ECU 22 for ABS purposes. This eliminates the factors such as tire rolling resistance, air drag, engine drag, etc. to calculate the deceleration that is only generated by the brake system. One of the benefits of using this signal is to take the noise factors out of the equation and establish reliable reference between pressure and deceleration.

With respect to brake fade factors, the brake system performance degradation caused by fade is represented by a fade factor in a percentage value. There are generally two components that contribute to the overall fade factor. The first component being output, and the second component being compliance. Each one calculates their own fade factor by comparing the current performance against the reference maps. The two factors will be blended in as the overall fade factor. The PV factor measures the fluid volume increase during braking events, and calculates a change factor in percentage, which is calculate by: Factor=((Measured volume−Volume thr)/Max_error_thr)*100%. The "Measured volume" is the volume of fluid that is currently consumed. The "Volume thr" relates to the volume threshold as explained above. The "Max_error_thr" is the allowed maximum PV growth during high temperature. This is trimmed such that the factor is 100% when the front rotor temperature is about 600 C. Obviously with the equation, the PV factor can exceed 100%. There is no upper limit, so that it can be used to monitor brake fluid boil, as discussed below.

Figure 4:
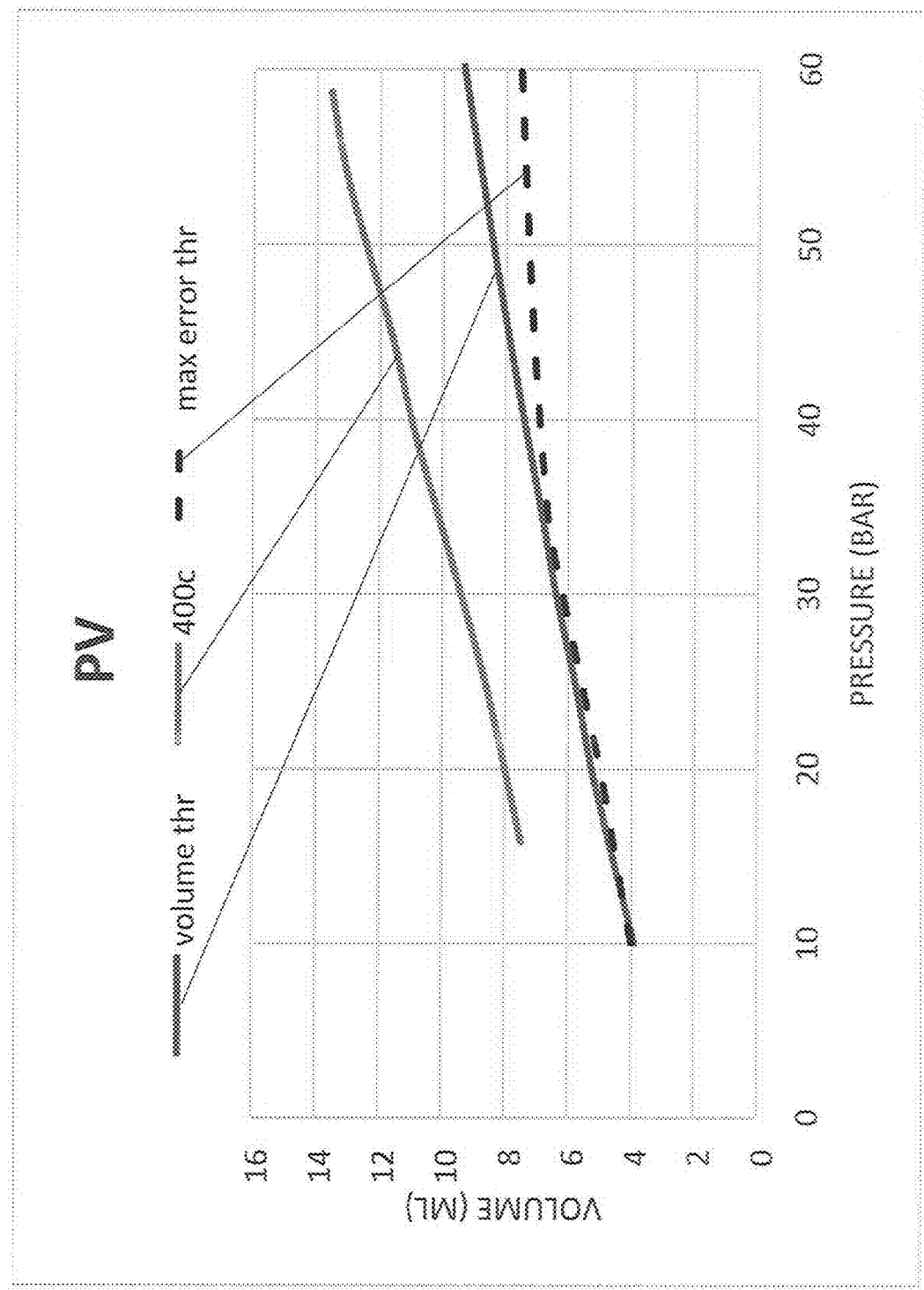
FIG. 4 is a graphical representation of PV characteristics for use in PV factor calculation.

Referring now to FIG. 4, an example of a PV factor calculation will now be discussed. To calculate the PV factor at 400 C, a 40 bar pressure can be used as an example. According to the equation above: PV Factor=((11−7.5)/7)*100%=50%.

The mechanism used to calculate deceleration factor is preferably the same as for the PV factor, with the addition that the deceleration factor is limited to 100%. There is preferably a low pass filter on the deceleration factor to eliminate noise caused by suspension movement, so that only steady state is considered.

Figure 5:
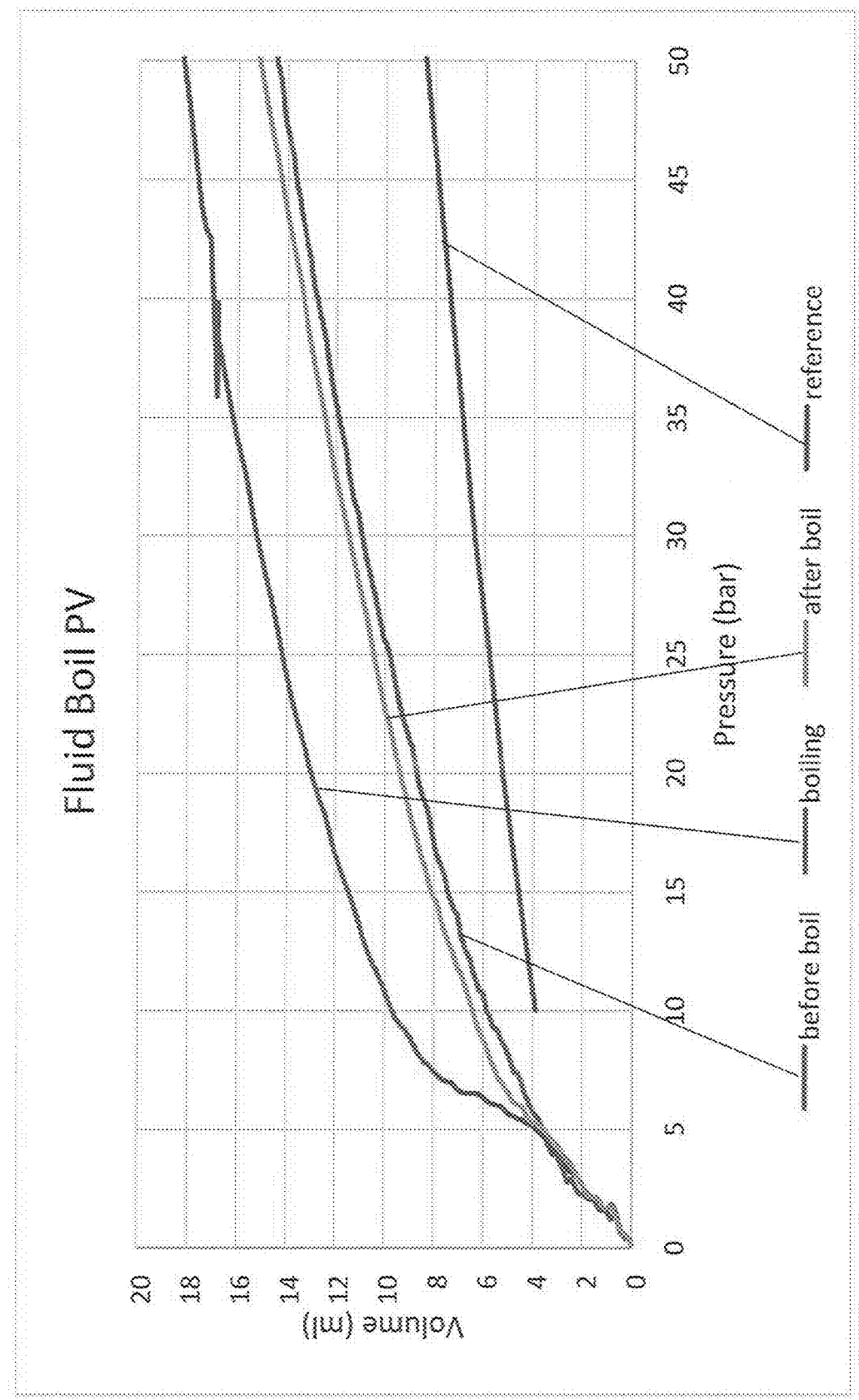
FIG. 5 is a graphical representation of fluid boil PV characteristics.

If the brake rotor and pad temperature stay high for a long period of time, the heat could be introduced or soaked into the calipers and eventually boil the fluid. When this happens, the compliance of the brake system 10 would have a dramatic increase. The plot of FIG. 5 illustrates the PV characteristics of the brake system 10 under different conditions. The detection for brake fluid boil generally has two criteria. The first criteria being that the brake temperature should be higher than the minimum fade enable temperature, which has been found to be about 400 C. The second criteria is that the PV factor should remain greater than 135% for about 1 second. Based on the data in the plot of FIG. 5, the PV factor can be calculated during fluid boiling to be about 140%. High brake temperature with a dramatic system compliance increase indicates fluid boil. Once fluid boil is detected, the brake system 10 can be determined to be under a brake fade "stage 2" (as discussed below). In this stage, it is preferred to limit the vehicle's top speed.

The brake thermal model estimates the brake rotor temperature by considering factors such as vehicle speed, brake pressure, ambient temperature, etc. The highest average axle temperature is used as the minimum enable threshold (about 400 C) for brake fade detection.

The overall brake fade factor is what finally triggers fade detection. The PV factor and the deceleration factor are weighted and then added together to determine the final brake fade factor in percentage form to represent the fade level and the performance changes. Typically, the higher the overall factor is, the worse the brake fade is. The overall brake fade factor is calculated with the equation: Factor=A*PV factor+(100%−A)*Decel factor. "A" is the weighing constant measured in percentage form. This constant depends on the material property of the brake pads. For example, in some brake pads, as the temperature increases, the output loss could be dramatic. While other brake pad materials may endure a consistent output, but a relatively large increase in compliance. Preferably, the factor is calibrated such that whichever has more of an impact on the brake performance is weighted more. For example, on a large truck or SUV platform, the compliance may consistently increase with growing temperature, while the output barely changes. In this case, "A" could be calibrated to 85% for final fade factor calculation.

Brake fade is not something that generally needs to be detected as quickly as possible. The phenomena develops very slowly and also typically disappears slowly. Preferably, the detection is only enabled when both the brake system 10 and the vehicle are in a steady state. It is preferred that certain conditions are met to enable detection. These conditions include, for example, that the vehicle speed is above about 4 m/s and that the brake system 10 is not undergoing a slip control event. Additionally, the pressure gradient should be less than about 300 bar/s and greater than about −3 bar/s. Also, the boost pressure should be greater than about 15 bar/s.

The term "Stage 1" brake fade can be defined as when the brakes are hot and that there are signs of performance degradation due to the high temperature, but not significantly decreased, and there is very little possibility of hardware damage. In addition to the overall brake fade detection enable conditions discussed above, the entry criteria for Stage 1 brake fade should include that the maximum axle average brake thermal temperature exceeds about 400 C and that the brake fade factor is above 45% for about 800 milliseconds. Of course, "Stage 2" brake fade should not have been reached.

The term "Stage 2" brake fade can be defined as when the brake system is overheated and the performance has degraded significantly. Hardware is likely to be damaged if the brake system stays in this current condition for a period of time. Therefore, a countermeasure should be in place in a relatively short period of time upon determination that the Stage 2 has been reached. The entry criteria for Stage 2 brake fade should include that the maximum axle average brake thermal temperature exceeds about 400 C and that the brake fade factor is above 90% for about 800 milliseconds. If brake fluid boil is detected, the above criteria may be overwritten and Stage 2 brake fade will be triggered immediately.

The brake fade stages may be reset upon determination of certain conditions being met. For example, the brake fade stages may be reset if the maximum axle average brake thermal temperature falls below 250 C. Alternatively or additionally, the brake fade stages may be reset if the PV factor is less than about 40% and/or the Deceleration factor is less than about 30%, for example. After 500 milliseconds within these conditions, the fade detection can be reset. However, a special situation may be during a cycling ignition. If the driver stopped the vehicle and had an ignition cycle after any stage brake fade, the fade detection may automatically start the new ignition cycle with a Stage 1 fade. In the case of a Stage 2 brake fade, always limiting vehicle speed may be considered unsafe in some situations, such as during highway driving. However, the system could be configured to be capable of going back to Stage 2 if the above discussed criteria match even in the new ignition cycle.

Upon brake fade detection, it is generally advisable to notify the driver of this condition and to possibly control the brake system 10 accordingly. Under faded conditions, the intent is to provide as much conventional feedback of brake fade to the driver as possible within the constraints of the brake system 10. After crossing both fade factor and thermal thresholds, the ECU 22 of the brake system 10 can notify the driver that they are reaching the limits of the brake system through a driver information center (DIC) display message, for example. Additionally, the brake system 10 could alter the pedal feel to alert the driver. Optionally, if the driver fails to take action to reduce the input to the brakes, the vehicle could be speed limited to force reduction as a last resort.

Figure 6:
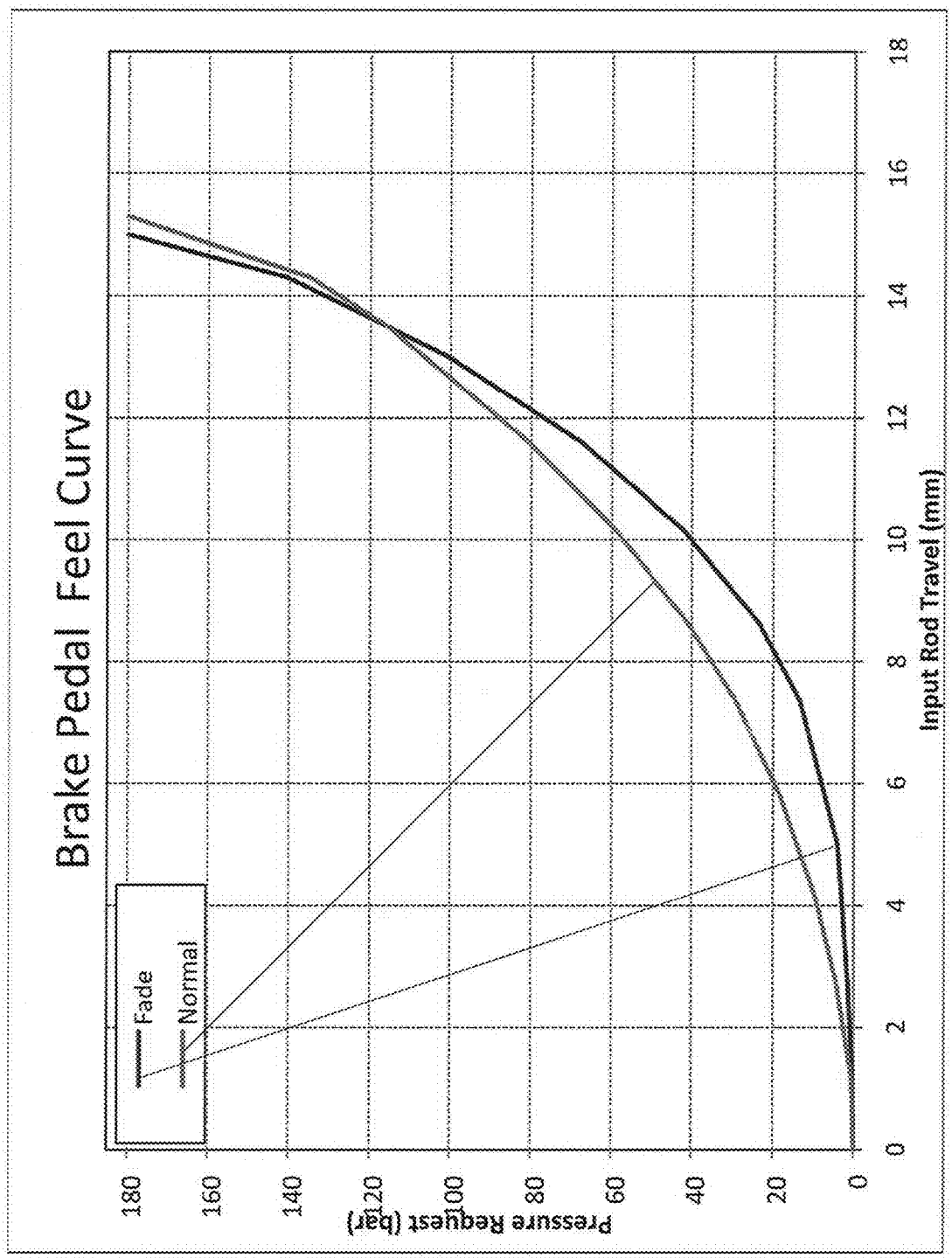
FIG. 6 is a graphical representation of a brake pedal feel curve comparing normal braking versus braking during a brake fade event.

At detection of a Stage 1 fade, the driver should be warned and the brake pedal travel to pressure curve is altered to simulate the "fade feel" as in a conventional brake systems such that the brake pedal 70 needs to be pushed further to achieve the same amount of pressure. There may also be a DIC message with an optional chime or other audible warning to further alert the driver. There is illustrated in FIG. 6 an example of a brake pedal feel curve showing a comparison between a normal pedal travel to pressure curve and a faded pedal travel to pressure curve. While at a detection of a Stage 2 fade, the brake pedal travel to pressure curve remains altered by the brake system 10, and a reminder DIC message may be sent. In addition, vehicle speed may be limited to a maximum speed, such as 70 kph, for example.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of detecting brake fade for a vehicle brake system having wheel brakes susceptible to brake fade, the method comprising:
   storing vehicle deceleration data and brake system fluid volume at different pressure points in a histogram;
   establishing adaptive reference maps based on the histogram, the adaptive reference maps comprising an adaptive reference map of vehicle deceleration and an adaptive reference map of brake system fluid;
   determining a presence of brake fade within the vehicle brake system based on the established adaptive reference maps;
   determining a vehicle deceleration factor based on a measured decrease in deceleration during a braking event;
   determining a Pressure-Volume (PV) factor based on a measured increase in the brake system fluid volume during the braking event;
   weighting the PV factor and the vehicle deceleration factor by a weighting constant, wherein the weighting constant is based on a material property of brake pads for the wheel brakes; and
   generating an overall brake fade factor for detecting the brake fade based on the weighted PV factor and the weighted vehicle deceleration factor;
   wherein establishing the adaptive reference maps comprises establishing the adaptive reference map of vehicle deceleration at different pressure points utilizing the histogram by providing a searching algorithm seeking pre-defined pressure points during the braking event, and wherein current vehicle deceleration data is learned to the adaptive reference map of vehicle deceleration when a boost pressure is within a given range of one of the pre-defined pressure points;
   further comprising calculating a vehicle deceleration change factor as a percentage based on the vehicle deceleration factor;
   wherein the establishing the adaptive reference maps comprises establishing the adaptive reference map of brake system fluid volume at different pressure points utilizing the histogram by providing the searching algorithm seeking pre-defined pressure points during the braking event, and wherein a current brake system fluid volume is learned to the adaptive reference map of vehicle deceleration when the boost pressure is within a given range of one of the pre-defined pressure points;
   further comprising calculating a PV change factor as a percentage based on the determined PV factor;
   wherein the generating the overall brake fade factor comprises adding the weighted vehicle deceleration factor and the weighted PV factor together to provide the overall brake fade factor;
   wherein the weighting the PV factor and the vehicle deceleration factor by the weighting constant comprises multiplying the vehicle deceleration factor and the PV factor by the weighting constant.

2. The method of claim 1, further comprising providing a brake system including the wheel brakes, wherein the brake system comprises a plunger assembly having a housing defining a bore therein, wherein the plunger assembly includes a piston slidably disposed therein such that movement of the piston pressurizes a pressure chamber when the piston is moved in a first direction, and wherein the pressure chamber of the plunger assembly is in fluid communication with an output, and wherein the plunger assembly further includes an electrically operated linear actuator for moving the piston within the bore.

3. The method of claim 1, further comprising adjusting the adaptive reference maps in response to a brake thermal model determining that a braking temperature is within a given temperature range.

4. A method of detecting brake fade for a vehicle brake system having wheel brakes susceptible to brake fade, the method comprising:
   storing vehicle deceleration data and brake system fluid volume at different pressure points in a histogram;
   establishing adaptive reference maps based on the histogram, the adaptive reference maps comprising an adaptive reference map of vehicle deceleration and an adaptive reference map of brake system fluid;
   determining a presence of brake fade within the vehicle brake system based on the established adaptive reference maps;
   evaluating a current boost pressure relative to the histogram to determine whether the current boost pressure is within a given range of a given pressure point of pressure points of the histogram; and
   storing the current boost pressure in the adaptive reference map of vehicle deceleration in response to determining that the current boost pressure is within the given range of the given pressure point of the pressure points of the histogram.

5. The method of claim 4, further comprising:
   determining whether a learning condition is satisfied; and
   enabling a searching algorithm to evaluate the current boost pressure relative to the histogram to determine whether the current boost pressure is within the given range of the given pressure point of the pressure points of the histogram in response to determining that the learning condition is satisfied.

6. The method of claim 5, wherein the current boost pressure is stored in the adaptive reference map of vehicle deceleration of the adaptive reference maps in response to the searching algorithm determining that the current boost pressure is within the given range of the given pressure point of the pressure points of the histogram.

7. The method of claim 5, further comprising storing a current brake system fluid volume in the adaptive reference map of brake system fluid of the adaptive reference maps in response to determining that the current boost pressure is within the given range of the given pressure point of the pressure points of the histogram.

8. The method of claim 5, wherein the learning condition comprises a pressure gradient being less than about a first pressure gradient threshold and greater than a second pressure gradient threshold.

9. The method of claim 8, wherein the learning condition corresponds to learning conditions and further comprise a given wheel brake of the wheel brakes having a temperature that is less than about 250 Celsius.

10. The method of claim 8, wherein the first pressure gradient threshold is about 30 bar/s and the second pressure gradient threshold is about −3 bar/s.

* * * * *